Figure 1:
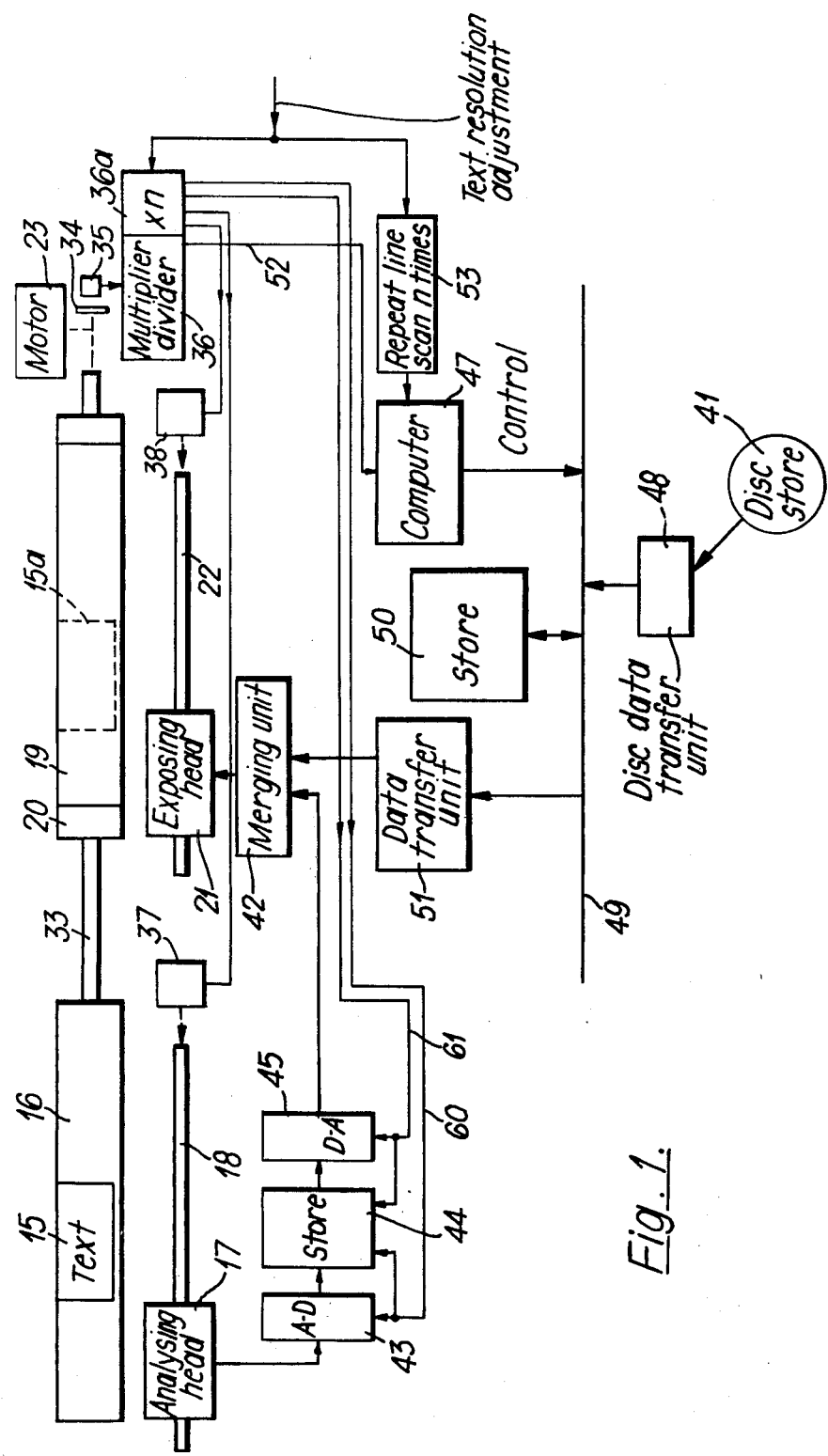

United States Patent [19]

Pugsley et al.

[11] 4,135,212
[45] Jan. 16, 1979

[54] PRINTING METHODS AND APPARATUS

[75] Inventors: Peter C. Pugsley, Pinner; Peter J. Wood, Potters Bar, both of England

[73] Assignee: Crosfield Electronics Limited, London, England

[21] Appl. No.: 809,685

[22] Filed: Jun. 24, 1977

[30] Foreign Application Priority Data

Jun. 28, 1976 [GB] United Kingdom ............... 26843/76

[51] Int. Cl.² .................. B41B 19/06; H04N 1/04
[52] U.S. Cl. ............................... 358/256; 354/6; 358/285; 358/296
[58] Field of Search ................ 354/5, 6, 7, 11; 358/256, 283, 285, 287, 296, 297

[56] References Cited

U.S. PATENT DOCUMENTS

| | | | |
|---|---|---|---|
| 3,541,245 | 11/1970 | Wilby | 358/287 |
| 3,626,824 | 12/1971 | Kolb et al. | 354/6 |
| 3,828,319 | 8/1974 | Owen et al. | 358/256 |
| 3,949,159 | 4/1976 | Ricards et al. | 358/256 |
| 3,956,583 | 5/1976 | Pugsley | 358/256 |
| 4,004,079 | 1/1977 | Boston | 358/256 |

*Primary Examiner*—Robert L. Griffin
*Assistant Examiner*—Joseph A. Orsino, Jr.
*Attorney, Agent, or Firm*—Kemon & Estabrook

[57] ABSTRACT

In a method of image reproduction in which both pictures and test are to be combined in an image on a single sheet for use in the reproduction of a printed page, and in which the signals resulting from the scanning of the pictures are stored prior to the preparation of the sheet, a high resolution is achieved in the reproduction of the text without requiring excessive storage capacity for the picture signals by scanning the text at a resolution which is an integral multiple n of the picture resolution and, when the text and picture signals are merged to control an output scanner operating at the higher resolution, applying each line of picture signals extracted from store n successive times to the output scanner.

5 Claims, 2 Drawing Figures

PRINTING METHODS AND APPARATUS

This invention relates to a method and apparatus for reproducing both pictures and text on a sheet or surface for use in the production of a printed page.

In a method according to the present invention, the pictorial matter is scanned at a first resolution to derive electric signals, representing the density values of successively scanned elements, which are stored line by line; the textual matter is scanned at a second and higher resolution which is an integral multiple n of the first resolution to derive text-representing signals; the text-representing signals are merged with signals which have been extracted from store and which represent each line in turn of the pictorial matter, the merged signals controlling an output scanner operating at the said higher resolution for treating the said sheet or surface to form the reproductions thereon; and the signals for each line of the pictorial matter extracted from store are applied n successive times to the output scanner, corresponding to the scanning of n successive lines of the said sheet or surface, before the signals for the next line of the pictorial matter are extracted.

The advantage of this method of merging text and pictures is that a high resolution of reproduction of the text can be carried out in synchronism with the picture reproduction and without employing the same high resolution for the picture reproduction; the high resolution would be unnecessarily high for the pictorial matter and if high resolution scanning of the pictorial matter were carried out initially the storage requirement for the picture signals would be very much greater. This excessive storage requirement is avoided by maintaining the lower resolution of the pictorial information until the final exposing stage and then using the signals for each line n times.

Figure 2:
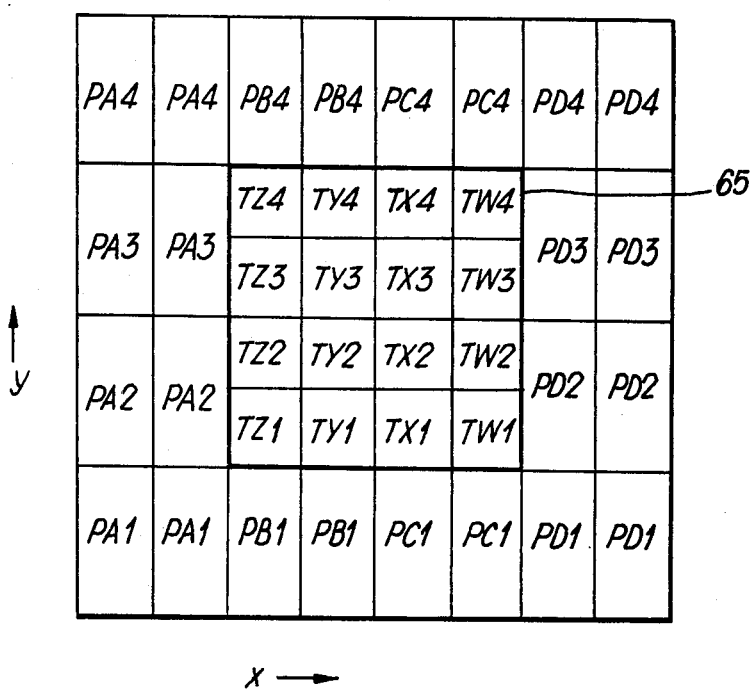

In order that the invention may be better understood, one example of a method and apparatus for carrying out the invention will now be described with reference to the accompanying drawings, in which:

FIG. 1 shows diagrammatically one form of apparatus for reproducing the higher resolution text and lower resolution pictures; and FIG. 2 shows diagrammatically the manner in which pictorial material and textual material are reproduced at different resolutions on the output surface.

FIG. 1 of the drawings shows image-analysing and image-reproducing scanners of the cylinder type. A piece of text 15 to be reproduced is mounted on an input drum 16 which is scanned by a photo-electric analysing head 17 mounted on a lead screw 18. A sheet of film 19 on which the text, merged with pictures, is to be reproduced, is mounted on an output drum 20 which is scanned by an exposing head 21 mounted on a lead screw 22. The scanning is effected by means of a motor 23 driving the shaft 33 on which the drums are mounted. A disc 34 having a ring of apertures is also driven by the motor 23 and a photo-electric device 35 which sees the apertures in the disc 34 provides a train of signals for a multiplier-divider unit 36, the operation of which will be explained in greater detail later. Signals from the multiplier-divider unit 36 control servo devices 37 and 38 which in turn control the rotation of the lead screws 18 and 22 respectively. As a consequence there is a slow movement of the analysing head along the lead screw 18 while the drum 16 is rotating; similarly there is a slow movement of the exposing head along the lead screw 22 while the drum 20 is rotating. Consequently, each of the heads traces a helical scanning path around the periphery of its drum. The text 15 is to be merged on the output 19 with pictures. Signals representing these pictures are stored in a disc store 41. These signals may represent a number of separate pictures to be exposed on to the film 19 but the stored data is arranged on the disc store 41 in such a manner that the signals required to expose a complete circumferential line of the output film 19 are obtained in succession from the disc store. It will be appreciated that this line may pass through one or more pictures and the text area on the film, represented by the dotted line 15a. There are gaps in the information stored in the disc store, corresponding to the passage of the scanning lines through the area 15a, to permit the insertion of the text data derived from the analysing head 17.

One method of assembling the pictorial information derived from a number of pictures on the disc store 41 is described in our co-pending United States patent application No. 809,684 of even date, to which reference may be made for further information.

To combine the textual data and the pictorial data, two sets of signals are derived and combined in a merging unit 42. Signals from the analysing head 17 and corresponding to the scanned text are applied to an analogue-to-digital converter 43 and the resulting digital signals are transferred to a store 44. The digital signals are extracted from the store 44 as required and are reconverted to analogue form in a digital-to-analogue converter 45. These analogue signals are directed to the merging circuit 42.

In the same operation pictorial signals are extracted from the disc store 41 under the control of a computer 47, by way of a disc data transfer unit 43, a data highway 49, a buffer store 50 and a data transfer unit 51. The buffer store 50 absorbs the differing data rates of the disc 41 and the scanner. From the data transfer unit 51, the pictorial signals are applied to the merging circuit 42. The output signals of the merging unit control the exposing head 21, which includes a light source and modulator such that a modulated light beam scans over the surface of the light sensitive film 19. Details of a suitable merging unit are also described in the above-mentioned co-pending patent application.

To permit the textual data to be reproduced with a much higher definition than that required for pictorial matter, we arrange that the text 15 is scanned at the required high resolution (e.g., 600 lines per inch) and we select this figure to be an integral multiple of the resolution of the pictorial matter, which may be 300 lines per inch, for example. The manner in which this is achieved will now be described.

As previously explained, the multiplier-divider unit 36 receives pulses from the photo-electric device 35 at a rate dependent on the rate at which the drum shaft 33 is driven by the motor 23. The unit 36 correspondingly controls the rate of rotation of the lead screws 18 and 22. The rate of rotation of the lead screws is such as to give a line scan at the higher resolution, i.e., 600 lines per inch in this example. The higher resolution is governed by a text resolution adjustment section 36a of the multiplier-divider unit 36, permitting the test resolution to be increased by a factor of n, in this case 2.

The multiplier-divider unit 36 controls the rate at which the computer 47 extracts data from the disc store 41, this control being excercised by way of the line 52. This data extraction of successive pictorial elements to be exposed on a circumferential line of the film 19 is effected at the lower data rate, i.e., at a circumferential rate corresponding to 300 lines per inch in this example. However, the text resolution selection also acts through a repeating means 53 to cause the computer 47 to effect the transfer of each line of information from the disc store 41 n times (in this case twice) in succession to the data transfer unit 51 and thence through the merging unit to the exposing head; in this way the lower resolution of the stored pictorial matter is matched to the higher line scan rate of the exposing system.

The resolution of the textual matter in the axial direction of the drum 16 is governed by the relationship between the rate of rotation of the drum and the movement of the analysing head along the lead screw and is therefore at the higher resolution rate. To ensure that the resolution of the textual matter in the circumferential sense of the drum is at the same resolution, the rate of sampling of the analogue information and conversion of this information to digital form is controlled from the section 36a of the multiplier-divider unit over a line 60, which also controls the rate at which this information is read into the store 44. The rate at which information is extracted from the store and reconverted to analogue form is similarly controlled over line 61 from the section 36a of the multiplier-divider unit. In this way, it is ensured that the circumferential resolution of the signals applied from the converter 45 to the merging unit is at the higher rate.

If the text 15 is to be reproduced on the sheet 19 at the same size, the two servos 37 and 38 are driven at the same rate by pulse trains from the section 36a of the multiplier-divider unit 36. Similarly the two control lines 60 and 61 will carry pulses at the same frequency. If however enlargement or reduction of the text 15 is required, the servos 37 and 38 receive pulse trains of different rates and rotate the lead screws 18 and 22 at different speeds and the pulse rates on lines 60 and 61 are different so that the rate of reading data from the store 44 differs from the rate of sampling and writing into the store.

The effect of the merging of the different resolution components on the output film is shown in FIG. 2 which represents diagrammatically a portion of the output film, containing an area 65 of textual matter. In FIG. 2 the direction x represents the direction of the drum axis when the film is exposed on the output drum and the direction y represents the circumferential direction of the drum at that time. It will be seen that in one line scan the computer 47 extracts the pictorial information elements PA1, PA2, PA3 and PA4 in succession. In the next line scan, it again extracts and applies to the exposing head the data elements PA1, PA2, PA3 and PA4. In the next line scan, the computer extracts element PB1 from the disc store 41 but then finds a gap in the data stored by the store 41 representing the section of this line to be occupied by the textual matter. At this point, the merging unit receives from the text analyser successive signals at the higher resolution corresponding to text data elements TZ1, TZ2, TZ3 and TZ4. It is assumed for this example that this is the total circumferential length of the textual matter to be inserted, although it will be understood that in practice, this length may comprise several thousand textual data elements. Thus in this example, after the text element TZ4, the end of the gap in the stored pictorial information is reached and the computer causes the extraction of pictorial element PB4 and applies it to the merging unit for a period corresponding to the lower resolution.

In the next line scan, the computer again extracts pictorial element PB1 and applies it to the merging circuit for the longer period, after which the merging unit receives textual data elements TY1, TY2, TY3 and TY4 for the shorter periods corresponding to the higher resolution; thereafter the computer again extracts pictorial data element PB4. This form of operation continues in the same manner until the end of the textual area in the direction x is reached, at which time the computer will extract on two successive line scans the pictorial data elements PD1 to PD4.

The advantage of this method of operation is that the 300 line/inch resolution is maintained for the pictorial matter until the final stage of the page preparation, in which the high-definition textual matter and the pictorial matter are nevertheless scanned together. This avoids the very high data storage requirement that would exist if the pictorial matter were present at the 600 line/inch resolution from the point at which this pictorial matter was initially scanned to provide density-representing signals.

For further information regarding the operation of the multiplier-dividing unit and the manner in which it controls the rates of rotation of the lead screws and the operation of the analogue-digital and digital-analogue converters and their intermediate store, reference may be made to our U.S. Pat. No. 3,541,245.

It will be appreciated that the output of the apparatus need not be a light-sensitive photographic film; it may for example be a sheet incorporating a thin metal layer in which holes are formed by a laser forming part of the output scanner, or the laser may act directly on a suitable cylinder surface to form recesses for gravure printing.

We claim:

1. A method of reproducing both pictorial matter and text on a sheet or surface for use in the production of a printed page, comprising the steps of:

photoelectrically scanning the said pictorial matter at a first resolution to derive electric signals representing the density values of successively scanned elements, storing the said picture-representing signals line by line;

photoelectrically scanning the text at a second and higher resolution which is an integral multiple n of the first resolution;

merging the resulted text-representing signals and picture-representing signals which have been extracted from the said store;

controlling substantially simultaneously with the photoelectric scanning of the text, an output scanner in accordance with the merged signals for treating the said sheet or surface to form the reproductions thereon;

the output scanner being operated at the said higher resolution and the signals for each line of the pictorial matter extracted being applied n successive times to the output scanner, corresponding to the scanning of n successive lines of the said sheet or surface, before the signals for the next line of the pictorial matter are extracted.

2. A method in accordance with claim 1, in which the signals derived by scanning the said text are applied to an analogue-to-digital converter having a sampling rate corresponding to the said higher resolution, and in which the resulting digital signals are subsequently reconverted to analogue form before being merged with the picture-representing signals.

3. Apparatus for reproducing both pictures and text on a sheet or surface for use in the production of a printed page, comprising:

scanning means for analysing at a first resolution the said pictures to be reproduced to derive electric signals representing the densities of successively scanned elements of the said pictures;

a store for storing the said picture-representing signals;

text-scanning means for analysing the said text at a second and higher resolution which is an integral multiple n of the fist resolution;

a merging circuit;

an output scanning means responsive to the output of the merging circuit to scan the said sheet or surface at the said second and higher resolution to form thereon a reproduction of the matter represented by the output of the merging circuit, the scanning of the area of the sheet or surface to be occupied by text being substantially simultaneous with the operation of the text-scanning means; means for applying the said text-representing signals to the merging circuit;

and means for applying the said picture-representing signals to the merging circuit and operating to apply each line of the said picture-representing signals n successive times to the merging circuit.

4. Apparatus in accordance with claim 3, comprising an analogue-to-digital converter connected to receive the text-representing signals from the text scanning means and operative to sample the said signals at a rate corresponding to the said second and higher resolution, and a digital-to-analogue converter for thereafter reconverting the signals to analogue form for application to the merging circuit.

5. Apparatus in accordance with claim 4, in which the output scanning means comprises a cylinder carrying the sheet or surface on which the text and pictures are to be reproduced and a motor for driving the said cylinder in rotation, and further comprising means for obtaining a train of electric signals representing increments of rotation of the cylinder and a multiplier-divider circuit responsive to the said train of electric signals for producing further trains of electric signals at frequencies required for controlling the extraction of the picture-representing signals from the store and the rate of sampling the said text-representing analogue signals by the analogue-to-digital converter.

* * * * *